United States Patent
Yun

[11] Patent Number: 6,084,949
[45] Date of Patent: Jul. 4, 2000

[54] TELEPHONE SYSTEM WITH AUTOMATIC DIALING USING INFRARED TRANSMISSION FROM ELECTRONIC POCKET BOOK

[75] Inventor: Sung-Hum Yun, Gumi, Rep. of Korea

[73] Assignee: SamSung Electronics Co., Ltd., Kyungki-do, Rep. of Korea

[21] Appl. No.: 08/872,766

[22] Filed: Jun. 5, 1997

[30] Foreign Application Priority Data

Jun. 5, 1996 [KR] Rep. of Korea ............ 96-20057

[51] Int. Cl.⁷ ............ H04M 11/00; H04M 1/00
[52] U.S. Cl. ............ 379/56.3; 379/102.01; 379/355
[58] Field of Search ............ 379/355, 356, 379/357, 56.1, 56.2, 56.3, 110.1; 455/459, 387, 102.01, 101, 564; 359/172, 149, 147, 143, 144

[56] References Cited

U.S. PATENT DOCUMENTS

| | | |
|---|---|---|
| 4,130,738 | 12/1978 | Sandstedt . |
| 4,456,925 | 6/1984 | Skerlos et al. . |
| 4,553,267 | 11/1985 | Crimmins . |
| 4,847,760 | 7/1989 | Yagi .................. 364/400 |
| 4,910,767 | 3/1990 | Brugliera et al. .......... 379/355 |
| 4,978,948 | 12/1990 | Andresen et al. . |
| 5,054,051 | 10/1991 | Hoff . |
| 5,138,649 | 8/1992 | Krisbergh et al. . |
| 5,144,654 | 9/1992 | Kelley et al. . |
| 5,379,319 | 1/1995 | Satoh et al. . |
| 5,454,035 | 9/1995 | Oba et al. . |
| 5,504,805 | 4/1996 | Lee . |
| 5,526,424 | 6/1996 | Karnowski . |
| 5,561,712 | 10/1996 | Nishihara .................. 379/355 |
| 5,570,295 | 10/1996 | Isenberg et al. . |
| 5,659,299 | 8/1997 | Williamson et al. .......... 340/825.57 |
| 5,797,089 | 8/1998 | Nguyen . |

FOREIGN PATENT DOCUMENTS

WO092010046  6/1992  WIPO .

*Primary Examiner*—Reinhard J. Eisenzopf
*Assistant Examiner*—Charles N. Appiah
*Attorney, Agent, or Firm*—Robert E. Bushnell, Esq.

[57] ABSTRACT

An automatic dialing method of a telephone system including an optical reception unit sensitive to infrared reception from an electronic pocketbook including an optical transmission unit for infrared transmission of a telephone number of an interested person registered in the electronic pocketbook. The dialing method includes receiving an infrared signal containing a telephone number of an interested person selected for an automatic dialing function, transmitted from the optical transmission unit of the electronic pocketbook, via the optical reception unit of the telephone system, when a telephone handset is in an off-hook state; analyzing data information representing the telephone number of the interested person contained in the infrared signal; and automatically dialing the telephone number of the interested person, via a dialer of the telephone system, corresponding to analyzed data information.

18 Claims, 2 Drawing Sheets

TELEPHONE SYSTEM WITH AUTOMATIC DIALING USING INFRARED TRANSMISSION FROM ELECTRONIC POCKET BOOK

CLAIM FOR PRIORITY

This application makes reference to, incorporates the same herein, and claims all benefits accruing under 35 U.S.C. £119 from an application for *DIALING DEVICE USING ELECTRONIC POCKETBOOK AND METHOD THEREOF* earlier filed in the Korean Industrial Property Office on Jun. 5, 1996, there duly assigned Ser. No. 20057/1996.

BACKGROUND OF THE INVENTION

1. Technical Field

The present invention relates to a telephone system, and more particularly, relates to a telephone system with automatic dialing using infrared transmission from an electronic pocketbook.

2. Related Art

Conventional electronic pocketbooks as disclosed, for example, in U.S. Pat. No. 4,117,542 for *Electronic Pocket Directory* issued to Klausner, U.S. Pat. No. 5,023,905 for *Pocket Data Receiver With Full Page Visual Display* issued to Wells, U.S. Pat. No. 5,150,293 for *Small Electronic Memo Data Storage, Display And Recall Apparatus* issued to Murata, and U.S. Pat. No. 5,526,424 for *Electronic Notepad* issued to Karnowski, are organized to feature a visual display, computer linking and a host of communication options and expandability, including touch screen display, word processor, calendar, scheduler, telephone directory and the like. Generally, telephone number registered in the electronic pocketbook must be manually retrieved by the user before the user can approach a telephone system and manually dial the telephone number of an interested person registered in the electronic pocketbook. Alternatively, the telephone number as registered in an electronic note disclosed, for example, in U.S. Pat. No. 5,454,035 for *Electronic Apparatus* issued to Oba et al, may be transmitted in a form of a dial tone signal to a telephone microphone in order to save the user the hassle of having to manually dial the telephone number registered in the electronic note at the telephone system. It is still inconvenient for the user to confirm the telephone number registered in the electronic pocketbook for automatic dialing purposes.

While conventional telephone systems such as disclosed in U.S. Pat. No. 5,506,895 for *Telephone Apparatus With Automatic Dialing Function* issued to Hirai et al., are widely organized to perform an automatic dialing function by way of, for example, optical scanning of telephone numbers from printed materials such as disclosed in U.S. Pat. No. 4,975,948 for *Rapid Dialing Method For Telecommunications* issued to Andresen et al., U.S. Pat. No. 5,144,654 for *Automatic Telephone Dialer System With Printed Storage* issued to Kelley et al., or by way of voice recognition as disclosed in U.S. Pat. No. 5,504,805 for *Calling Number Identification Using Speech Recognition* issued to Lee, or by way of body heat or infrared rays irradiated from a person as disclosed in U.S. Pat. No. 5,379,319 for *Telephone Apparatus* issued to Satoh et al., there is no convenient and effective way to link the electronic pocketbook with the telephone system which allows the user to automatically dial a telephone number at the telephone system under control of operation from the electronic pocketbook.

SUMMARY OF THE INVENTION

Accordingly, it is therefore an object of the present invention to provide a telephone system with automatic dialing using infrared transmission from an electronic pocketbook.

It is also an object to provide an electronic pocketbook with a telephone directory containing a plurality of telephone numbers of interested persons and an infrared transmitter for transmitting an infrared signal containing a telephone number selected for calling to the telephone system for automatic dialing purposes.

It is another object to provide a telephone system with an automatic dialer and an infrared receiver for receiving an infrared signal containing a telephone number selected for calling from the electronic pocketbook in order to perform an automatic dialing function.

These and other objects of the present invention can be achieved by an automatic dialing method of a telephone system including an infrared receiver sensitive to infrared reception from an electronic pocketbook including an infrared transmitter for infrared transmission of a telephone number of an interested person registered in the electronic pocketbook. The automatic dialing method includes receiving an infrared signal containing a telephone number of an interested person selected for an automatic dialing function, transmitted from the infrared transmitter of the electronic pocketbook, via the infrared receiver of the telephone system, when a telephone handset is in an off-hook state; analyzing data information representing the telephone number of the interested person contained in the infrared signal; and automatically dialing the telephone number of the interested person, via a dialer of the telephone system, corresponding to analyzed data information.

In accordance with one aspect of the present invention, an electronic pocketbook that uses infrared link to enable a telephone system to automatically dial a telephone number of an interested person includes a memory storing a directory of pre-registered telephone numbers of interested persons; a key input unit for allowing an operator to input telephone numbers, and to initiate transmission of an infrared signal containing a telephone number of an interested person selected for an automatic dialing function; a display unit for providing a visual display of telephone numbers input by the operator and the telephone number of the interested person selected by the operator for the automatic dialing function; an infrared transmitter for transmitting the telephone number of the interested person selected for the automatic dialing function in a form of an infrared signal; and a controller for controlling said infrared transmission of the infrared signal containing the telephone number of the interested person selected for the automatic dialing function.

In accordance with another aspect of the present invention, a telephone system linked to the electronic pocketbook includes a handset; an infrared receiver for receiving the infrared signal transmitted from the infrared transmitter of said electronic pocketbook; a controller for analyzing the telephone number contained in a received infrared signal; and a dialer for automatically dialing the telephone number contained in the received infrared signal analyzed from the controller.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
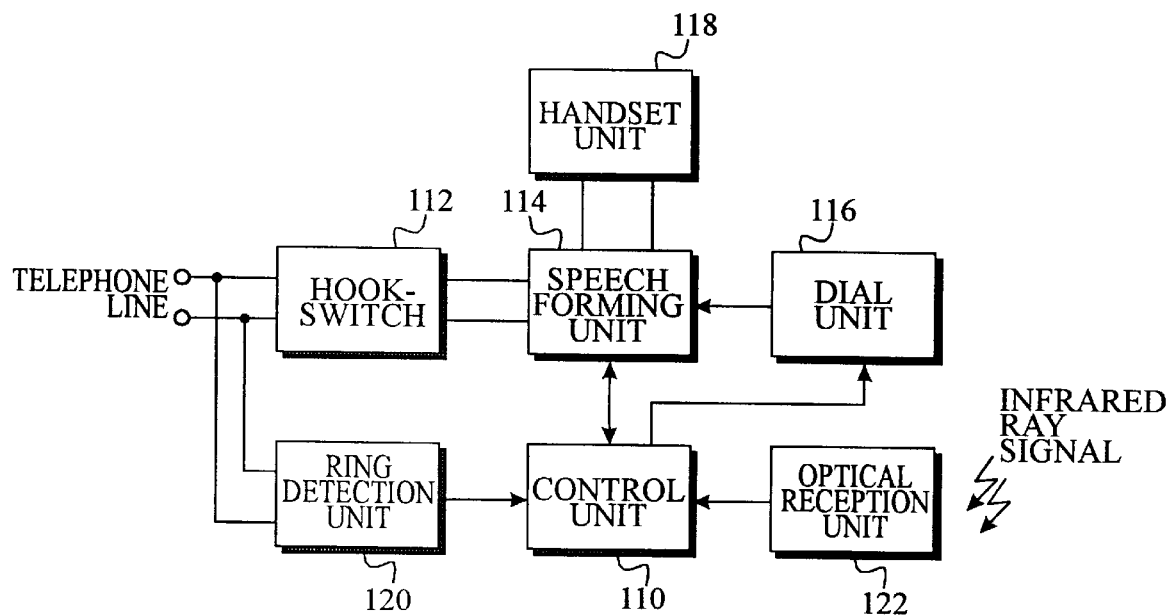
FIG. 1 is a block diagram of a telephone system constructed according to the principles of the present invention.

Referring now to the drawings and particularly to FIG. 1, which illustrates a telephone system constructed according to the principles of the present invention. As shown in FIG. 1, the telephone system includes a control unit 110, a hook-switch 112, a speech forming unit 114, a dial unit 116, a handset unit 118, a ring detection unit 120 and an optical reception unit 122.

Control unit 110 may be constructed by a one-chip microprocessor for controlling the overall operation of the telephone system. The controller 110 includes a read-only-memory (ROM) for storing an application program and a random-access-memory (RAM) for temporarily storing data generated while executing the application program. The RAM has a key buffer for storing telephone numbers received from the optical receiving unit 122 for enabling performance of an automatic dialing function.

Hook-switch 112 is connected to a telephone line from a central telephone network, when the handset unit 118 is off-hook. Then, the speech forming unit 114 processes a voice signal for performing a call under control of the control unit 110. A dial unit 116 dials a telephone number under control of the control unit 110. The handset unit 118 converts a voice signal into an electric signal or the electric signal into the voice signal. The ring detection unit 120 detects a ring signal received through the telephone line and then provides the received signal to the control unit 110. The optical reception unit 122 receives an infrared ray signal containing a telephone number of an interested person transmitted from the electronic pocketbook and provides the same to the control unit 110 for enabling the dial unit 116 to perform an automatic dialing function.

Figure 2:
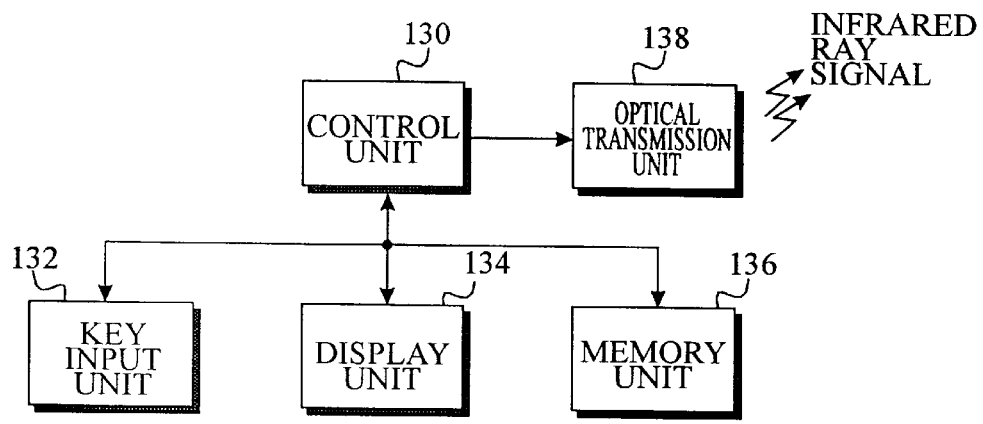
FIG. 2 is a block diagram of an electronic pocketbook constructed according to the principles of the present invention.

FIG. 2 is a block diagram of an electronic pocketbook constructed according to the principles of the present invention. As shown in FIG. 2, the electronic pocketbook includes a control unit 130, a key input unit 132, a display unit 134, a memory unit 136 and an optical transmission unit 138.

Control unit 130 controls overall functions of the electronic pocketbook including, for example, a calendar display mode, a schedule storage/display mode, a phone mode for an electronic phone book or the like. The key input unit 132 corresponds to a key matrix which includes mode selection keys for selecting any one of the foregoing modes, a dial key for initiating transmission of an infrared ray signal containing a telephone number selected by the user to the telephone system as shown in FIG. 1, via the optical transmission unit 122. Key matrix also contains template keys for permitting the user to input digits such as telephone numbers, character input keys for permitting the user to input characters and the like for memo, and a symbol telephone key for inputting a symbol for setting the digits input through the template keys as a telephone number.

The key input unit 132 provides key input data to the control unit 130. The display unit 134 in a form of liquid crystal display (LCD) provides a visual display of data information input from the key input unit 132 under control of the control unit 130. The memory unit 136 contains a read-only-memory (ROM) for storing programs for the control unit 130 to process data information in each mode of operation. In particular, the ROM stores a program for automatically transmitting a telephone number registered at the memo mode contained in a form of an infrared ray signal at the optical transmission unit 138, and a display control program for enabling the control unit 130 to control the visual display of data information in response to the user's key input. The memory unit 136 also contains a random-access-memory (RAM) for temporarily storing data information input through the key input unit 132. The optical transmission unit 138 converts data information provided from the control unit 130 into an infrared ray signal containing an electronic dial request and telephone number of an interested person selected for an automatic dialing function. After the conversion, the optical transmission unit 138 transmits the infrared ray signal containing the telephone number of the interested person to the telephone system as shown in FIG. 1 for performing an automatic dialing function.

Figure 3:
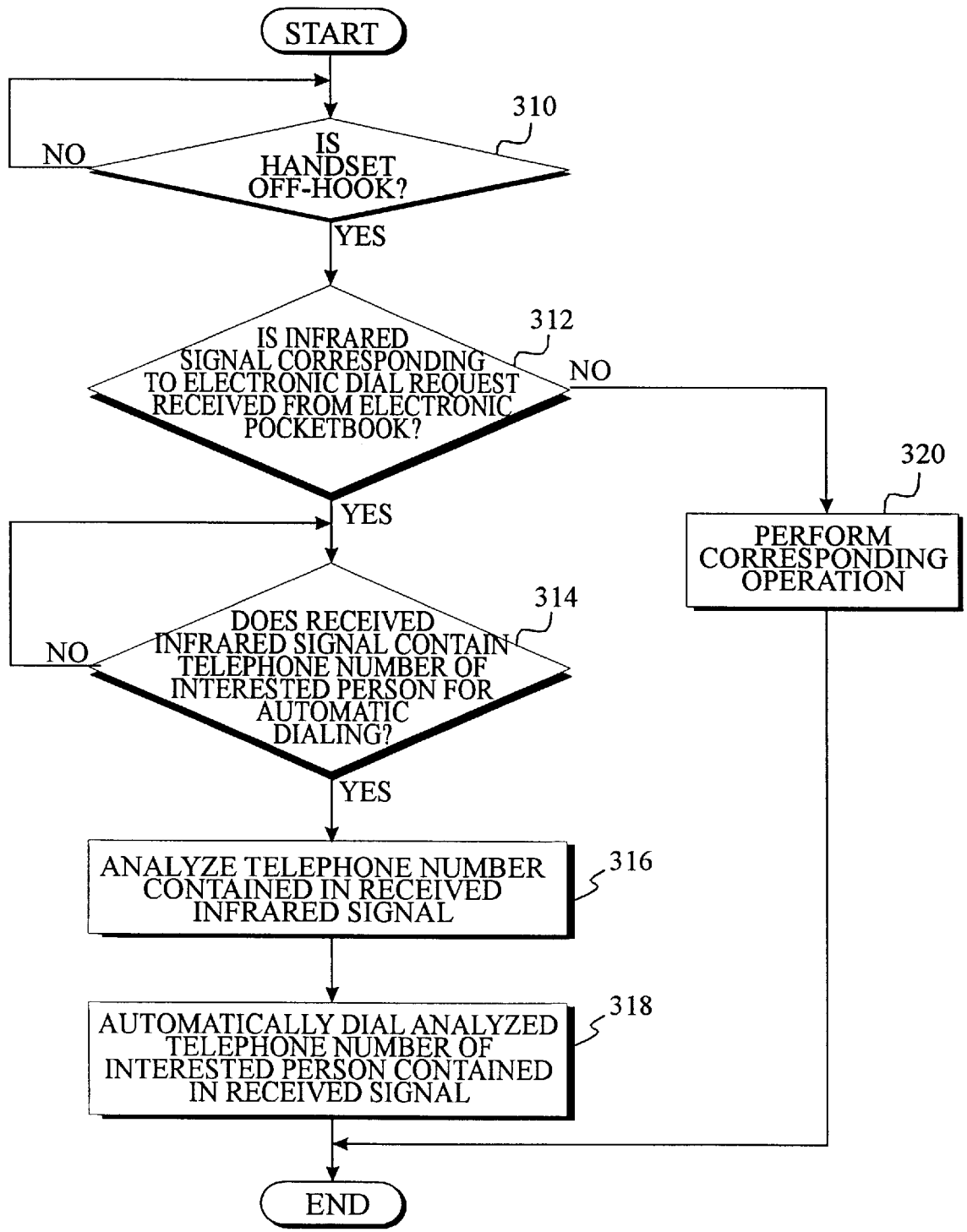
FIG. 3 is a control flow chart of an automatic dialing process according to the principles of the present invention.

Turning now to FIG. 3 which illustrates a control flow chart of an automatic dialing process between the telephone system of FIG. 1 and the electronic pocketbook of FIG. 2 according to the principles of the present invention. The process of dialing a telephone number of an interested person using the electronic pocketbook includes initially analyzing the telephone number contained in the infrared ray signal received from the electronic pocketbook after receipt of an electronic dial request in an off-hook state, and automatically dialing the analyzed telephone number contained in the infrared ray signal.

The automatic dialing operation using an electronic pocketbook according to the principles of the present invention will now be described in detail with reference to FIG. 3 hereinbelow.

First, the control unit 110 of the telephone system determines whether or not a handset unit 118 is off-hook in order to make a phone call at step 310. Here, when it is determined that the handset unit 118 is not off-hook, the control unit 110 returns to step 310 until the handset unit 118 is off-hook. When it is determined that the handset unit 118 is off-hook, however, the control unit 110 monitors whether an infrared ray signal corresponding to an electronic dial request is received from the electronic pocketbook via the optical reception unit 122. Herein, the infrared ray signal corresponding to the electronic dial request is transmitted from the electronic pocketbook through its optical transmission unit 138 under control of its control unit 130 in accordance with specific key input from the key input unit 132 included in the electronic pocketbook. At this time, if the infrared ray signal corresponding to the electronic dial request is not received from the electronic pocketbook, the control unit 110 proceeds to step 320, thereby performing the corresponding operation. However, if the infrared ray signal corresponding to the electronic dial request from the electronic pocketbook is received at step 312, the control unit 110 determines whether the infrared ray signal contains a telephone number of an interested person for an automatic dialing function at step 314.

It is noted that, prior to the transmission of infrared ray signal containing a telephone number of an interested person from an electronic pocketbook, data information stored in the memory 136 of the electronic pocketbook is first retrieved for a visual display on the display unit 134 in response to the user's specific key input via key input unit 132. Data information displayed on the display unit 134 is then confirmed by the user and is subsequently transmitted through the optical transmission unit 138 in response to the user's specific key input via key input unit 132. The data information transmitted generally includes a name of the interested person, an address, a telephone number and so on. However, for automatic dialing purposes, only telephone number of an interested person need be transmitted via optical transmission unit 138.

At step 314, when it is determined that the infrared ray signal received contains a telephone number of an interested person for an automatic dialing function, the control unit 110 of the telephone system proceeds to analyze the telephone number contained in the received infrared ray signal at step 316. Then, the control unit 110 proceeds to control the dial unit 116 to automatically dial the telephone number of the interested person after analyzing the telephone number contained in the infrared ray signal.

As described above, the present invention advantageously permits the user to automatically dial a telephone number of an interested person registered in an electronic pocketbook at a telephone system, directly from the electronic pocketbook via infrared ray transmission without having to require the user to manually dial the telephone number that he/she must memorize from the electronic pocketbook.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. An automatic dialing method of a telephone system including an optical reception unit sensitive to infrared reception from an electronic pocketbook including an optical transmission unit for infrared transmission of a telephone number of an interested person registered in the electronic pocketbook, comprising the steps of:

receiving an infrared signal transmitted from said optical transmission unit of said electronic pocketbook, via said optical reception unit of said telephone system, when a telephone handset is in an off-hook state, said infrared signal containing a telephone number of an interested person selected for an automatic dialing function and previously registered in said electronic pocketbook, wherein said electronic pocketbook is separately located from said optical reception unit, wherein said electronic pocketbook includes a first key input unit for manually inputting other telephone numbers, and wherein said telephone system includes a second key input unit for manually inputting additional telephone numbers;

analyzing data information representing the telephone number of the interested person contained in said infrared signal; and dialing, automatically, the telephone number of the interested person received via said optical reception unit, via a dialer of said telephone system, corresponding to the analyzed data information.

2. The automatic dialing method of claim 1, further comprised of said telephone system comprising:

said optical reception unit in a form of an infrared sensor for receiving said infrared signal transmitted from said optical transmission unit of said electronic pocketbook;

a control unit for analyzing the telephone number contained in said received infrared signal; and said dialer for automatically dialing the telephone number contained in said received infrared signal analyzed from said control unit.

3. An automatic dialing method of a telephone system including an optical reception unit sensitive to infrared reception from an electronic pocketbook including an optical transmission unit for infrared transmission of a telephone number of an interested person registered in the electronic pocketbook, comprising the steps of:

receiving an infrared signal transmitted from said optical transmission unit of said electronic pocketbook, via said optical reception unit of said telephone system, when a telephone handset is in an off-hook state, said infrared signal containing a telephone number of an interested person selected for an automatic dialing function and previously registered in said electronic pocketbook, wherein said electronic pocketbook is separately located from said optical reception unit, and wherein said telephone system includes a first key input unit for manually inputting other telephone numbers;

analyzing data information representing the telephone number of the interested person contained in said infrared signal; and dialing, automatically, the telephone number of the interested person received via said optical reception unit, via a dialer of said telephone system, corresponding to the analyzed data information;

said electronic pocketbook comprising:

a control unit for controlling all modes of operation of said electronic pocketbook including at least a calendar display mode, and a telephone mode for an electronic phone book;

a second key input unit including mode selection keys for selecting at least said telephone mode, a dial key for initiating transmission of said infrared signal containing the telephone number selected, via said optical transmission unit, and template keys for permitting a user to input digits such as telephone numbers for registration, wherein said second key input unit is for manually inputting additional telephone numbers;

a display unit for providing a visual display of data information input from the key input unit under control of the control unit;

a memory unit including a read-only-memory for storing programs for the control unit to process data information at least in said telephone mode of operation, and a random-access-memory for temporarily storing data information input through the key input unit; and said optical transmission unit for transmitting said infrared signal containing the telephone number of the interested person, when the user depresses said dial key after the telephone number registered in said memory unit is selected for an automatic dialing function.

4. The automatic dialing method of claim 2, further comprised of said electronic pocketbook comprising:

a control unit for controlling all modes of operation of said electronic pocketbook including at least a calendar display mode, and a telephone mode for an electronic phone book;

a key input unit including mode selection keys for selecting at least said telephone mode, a dial key for initiating transmission of said infrared signal containing the telephone number selected, via said optical transmission unit, and template keys for permitting a user to input digits such as telephone numbers for registration;

a display unit for providing a visual display of data information input from the key input unit under control of the control unit;

a memory unit including a read-only-memory for storing programs for the control unit to process data information at least in said telephone mode of operation, and a random-access-memory for temporarily storing data information input through the key input unit; and said optical transmission unit for transmitting said infrared signal containing the telephone number of the interested person, when the user depresses said dial key after the telephone number registered in said memory unit is selected for an automatic dialing function.

5. A communication system using infrared linking from an electronic pocketbook for performing an automatic dialing function at a telephone system to automatically dial a telephone number received via said linking, comprising:

said electronic pocketbook comprising:

a memory storing a directory of pre-registered telephone numbers of interested persons;

a first key input unit for allowing an operator to input telephone numbers, and to initiate transmission of an infrared signal containing a telephone number of an interested person selected for the automatic dialing function;

a display unit for providing a visual display of telephone numbers input by the operator and the telephone number of said interested person selected by the operator for the automatic dialing function;

an infrared transmitter for transmitting the telephone number of said interested person selected for the automatic dialing function in a form of an infrared signal; and a controller for controlling said infrared transmission of the infrared signal containing the telephone number of said interested person selected for the automatic dialing function;

said telephone system comprising:

a handset;

an infrared receiver for receiving said infrared signal transmitted from said infrared transmitter of said electronic pocketbook, wherein said telephone system includes a second key input unit for manually inputting additional telephone numbers;

a controller for analyzing the telephone number contained in said received infrared signal; and a dialer for automatically dialing the telephone number contained in said received infrared signal analyzed from said controller, wherein said electronic pocketbook is separately located from said telephone system.

6. The communication system of claim 5, further comprised of said controller of said electronic pocketbook further:

storing telephone numbers of interested persons input from said key input unit, in said memory, when a phone registration key from said key input unit is depressed by the operator;

determining whether a phone mode key is depressed by the operator; and accessing said memory for review and reproduce the telephone number of the interested person selected for the automatic dialing function from in said memory, and controlling infrared transmission of said infrared signal containing the telephone number of the interested person selected for the automatic dialing function, via said infrared transmitter.

7. The communication system of claim 6, further comprised of said memory including a read-only-memory unit for storing an infrared transmission program for the automatic transmission of the telephone number of the interested person in a form of said infrared signal at sad infrared transmitter, and a display control program for enabling the controller to control the visual display of data information in response to the operator's key input, via said key input unit.

8. The communication system of claim 7, further comprised of said memory including a random-access-memory for temporarily storing data information input through the key input unit.

9. The communication system of claim 5, further comprised of said controller of said telephone system further:

determining whether the handset is off-hook;

when the handset is off-hook, monitoring whether said infrared signal transmitted from said infrared transmitter of said electronic pocketbook is received via said infrared receiver;

analyzing data information representing the telephone number of the interested person contained in said infrared signal; and automatically dialing, via said dialer, the telephone number of the interested person corresponding to analyzed data information.

10. An electronic pocketbook using infrared linking to enable a telephone system to automatically dial a telephone number of an interested person registered in said electronic pocketbook, said telephone number received by an optical reception unit via said linking, comprising:

a memory storing a directory of pre-registered telephone numbers of interested persons;

a first key input unit for allowing an operator to input telephone numbers, and to initiate transmission of an infrared signal containing a telephone number of an interested person selected for the automatic dialing function;

a display unit for providing a visual display of telephone numbers input by the operator and the telephone number of said interested person selected by the operator for the automatic dialing function;

an infrared transmitter for transmitting the telephone number of said interested person selected for the automatic dialing function in a form of an infrared signal; and a controller for controlling said infrared transmission of the infrared signal containing the telephone number of said interested person selected for the automatic dialing function, wherein said electronic pocketbook is separately located from said optical reception unit, and wherein said optical reception unit includes a second key input unit for manually inputting additional telephone numbers.

11. The telephone system of claim 10, comprising:

a handset;

an infrared receiver for receiving said infrared signal transmitted from said infrared transmitter of said electronic pocketbook;

a controller for analyzing the telephone number contained in said received infrared signal; and a dialer for automatically dialing the telephone number contained in said received infrared signal analyzed from said controller.

12. An electronic pocketbook using infrared link to enable a telephone system to automatically dial a telephone number of an interested person registered in said electronic pocketbook, comprising:

a memory storing a directory of pre-registered telephone numbers of interested persons;

a first key input unit for allowing an operator to input telephone numbers, and to initiate transmission of an infrared signal containing a telephone number of an interested person selected for the automatic dialing function;

a display unit for providing a visual display of telephone numbers input by the operator and the telephone number of said interested person selected by the operator for the automatic dialing function;

an infrared transmitter for transmitting the telephone number of said interested person selected for the automatic dialing function in a form of an infrared signal; and a controller for controlling said infrared transmission of the infrared signal containing the telephone number of said interested person selected for the automatic dialing function;

said controller controlling said infrared transmission by:
  storing telephone numbers of interested persons input from said key input unit, in said memory, when a phone registration key from said key input unit is depressed by the operator;
  determining whether a phone mode key is depressed by the operator; and
  accessing said memory for review and reproduce the telephone number of the interested person selected for the automatic dialing function from said memory, and controlling said infrared transmission of said infrared signal containing the telephone number of the interested person selected for the automatic dialing function, via said infrared transmitter, wherein said electronic pocketbook is separately located from said telephone system, and wherein said telephone system includes a second key input unit for manually inputting additional telephone numbers.

13. The electronic pocketbook of claim 12, further comprised of said memory including a read-only-memory unit for storing an infrared transmission program for the automatic transmission of the telephone number of the interested person in a form of said infrared signal at said infrared transmitter, and a display control program for enabling the controller to control the visual display of data information in response to the operator's key input, via said key input unit.

14. The electronic pocketbook of claim 13, further comprised of said memory including a random-access-memory for temporarily storing data information input through the key input unit.

15. An electronic pocketbook using infrared link to enable a telephone system to automatically dial a telephone number of an interested person registered in said electronic pocketbook, comprising:

a memory storing a directory of pre-registered telephone numbers of interested persons;

a first key input unit for allowing an operator to input telephone numbers, and to initiate transmission of an infrared signal containing a telephone number of an interested person selected for the automatic dialing function;

a display unit for providing a visual display of telephone numbers input by the operator and the telephone number of said interested person selected by the operator for the automatic dialing function;

an infrared transmitter for transmitting the telephone number of said interested person selected for the automatic dialing function in a form of an infrared signal;

a first controller for controlling said infrared transmission of the infrared signal containing the telephone number of said interested person selected for the automatic dialing function;

said telephone system further comprising:
  a handset;
  an infrared receiver for receiving said infrared signal transmitted from said infrared transmitter of said electronic pocketbook;
  a second controller for analyzing the telephone number contained in said received infrared signal; and
  a dialer for automatically dialing the telephone number contained in said received infrared signal analyzed from said second controller;

said second controller further comprising:
  determining whether the handset is off-hook; when the handset is off-hook, monitoring whether said infrared signal transmitted from said infrared transmitter of said electronic pocketbook is received via said infrared receiver;
  analyzing data information representing the telephone number of the interested person contained in said infrared signal; and
  automatically dialing, via said dialer, the telephone number of the interested person corresponding to analyzed data information, wherein said electronic pocketbook is separately located from said telephone system, and wherein said telephone system includes a second key input unit for manually inputting additional telephone numbers.

16. A communication system using infrared linking from an electronic pocketbook for performing an automatic dialing function at a telephone system, comprising:

said electronic pocketbook comprising:
  a memory storing a directory of pre-registered telephone numbers of interested persons;
  a first key input unit for allowing an operator to input telephone numbers, and to initiate transmission of an infrared signal containing a telephone number of an interested person selected for the automatic dialing function;
  a display unit for providing a visual display of telephone numbers input by the operator and the telephone number of said interested person selected by the operator for the automatic dialing function;
  an infrared transmitter for transmitting the telephone number of said interested person selected for the automatic dialing function in a form of an infrared signal; and
  a first controller for controlling said infrared transmission of the infrared signal containing the telephone number of said interested person selected for the automatic dialing function;

said telephone system comprising:
a handset;
an infrared receiver for receiving said infrared signal transmitted from said infrared transmitter of said electronic pocketbook;

a second controller for analyzing the telephone number contained in said received infrared signal; and a dialer for automatically dialing the telephone number contained in said received infrared signal analyzed from said second controller, wherein said electronic pocketbook is separately located from said telephone system, and wherein said telephone system includes a second key input unit for manually inputting additional telephone numbers;

said second controller further comprising:

determining whether the handset is off-hook;

when the handset is off-hook, monitoring whether said infrared signal transmitted from said infrared transmitter of said electronic pocketbook is received via said infrared receiver;

analyzing data information representing the telephone number of the interested person contained in said infrared signal; and automatically dialing, via said dialer, the telephone number of the interested person corresponding to analyzed data information;

said first controller further comprising:

storing telephone numbers of interested persons input from said first key input unit, in said memory, when a phone registration key from said first key input unit is depressed by the operator;

determining whether a phone mode key is depressed by the operator; and accessing said memory for review and reproduce the telephone number of the interested person selected for the automatic dialing function from in said memory, and controlling infrared transmission of said infrared signal containing the telephone number of the interested person selected for the automatic dialing function, via said infrared transmitter.

17. The communication system of claim 16, further comprised of said memory including a read-only-memory unit for storing an infrared transmission program for the automatic transmission of the telephone number of the interested person in a form of said infrared signal at said infrared transmitter, and a display control program for enabling the first controller to control the visual display of data information in response to the operator's key input, via said key input unit.

18. The communication system of claim 17, further comprised of said memory including a random-access-memory for temporarily storing data information input through the key input unit.

* * * * *